United States Patent [19]

Knell et al.

[11] 4,038,246

[45] * July 26, 1977

[54] BUTADIENE RUBBERS STABILIZED WITH THIODIALKANOAMIDOPHENOLS

[75] Inventors: Martin Knell, Ossining; Martin Dexter, Briarcliff Manor, both of N.Y.

[73] Assignee: Ciba-Geigy Corporation, Ardsley, N.Y.

[*] Notice: The portion of the term of this patent subsequent to Sept. 26, 1989, has been disclaimed.

[21] Appl. No.: 309,847

[22] Filed: Nov. 27, 1972

Related U.S. Application Data

[63] Continuation-in-part of Ser. No. 267,265, June 29, 1972, abandoned, which is a continuation-in-part of Ser. No. 810,352, March 25, 1969, Pat. No. 3,679,744.

[51] Int. Cl.$^2$ ................................................ C08K 5/36
[52] U.S. Cl. .......................... 260/45.9 NC; 252/402
[58] Field of Search ................ 260/45.9 NC; 252/402

[56] References Cited

U.S. PATENT DOCUMENTS

| | | | |
|---|---|---|---|
| 3,590,083 | 6/1971 | Dexter et al. | 260/45.9 NC |
| 3,676,494 | 7/1972 | Biland et al. | 252/402 |
| 3,679,744 | 7/1972 | Knell et al. | 260/45.9 NC |
| 3,694,375 | 9/1972 | Knell et al. | 260/45.9 NC |

*Primary Examiner*—V.P. Hoke
*Attorney, Agent, or Firm*—Nestor W. Shust

[57] ABSTRACT

Butadiene rubbers, such as polybutadiene, polyisoprene and thermoplastic SBR rubber are stabilized against oxidative and/or thermal degradation with thiodialkanoamidophenol compounds.

7 Claims, No Drawings

BUTADIENE RUBBERS STABILIZED WITH THIODIALKANOAMIDOPHENOLS

This application is a Continuation-in-part application of co-pending application Ser. No. 267,265, filed June 29, 1972, now abandoned which in turn is a Continuation-in-part application of co-pending application Ser. No. 267,265, filed June 29, 1972 now abandoned, which in turn is a Continuation-in-part application of co-pending application Ser. No. 810,352, field March 25, 1969 now U.S. Pat. No. 3,679,744.

DETAILED DISCLOSURE

It is well known in the polymer art that all polymers are subject to oxidative and/or thermal degradation which results in their loss of physical properties and the development of undesireable color. When a substantial portion of the polymer is degraded, it loses its usefulness for a particular purpose. Butadiene containing rubbers the undergo the same type of oxidative and/or thermal degradation. Prior to manufacturing, the butadiene rubber must pass through a drying stage when it is subjected to a considerable heat and through a storage stage when it is subject to oxidative degradation. The degradation of butadiene rubber takes the form of cross-linking which results in a gel formation. In the case of polyisoprene chain scission takes place with decomposition which causes the polymer to become soft and sticky. Additives are therefore needed to inhibit the decomposition processes of these polymers.

The present invention therefore deals with the stabilization of butadiene rubbers which is accomplished by incorporating therein N,N'-bis(alkylhdroxyphenyl)-thiaalkanedicarboxamides having the structure

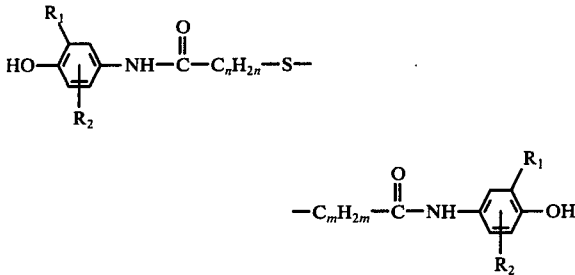

wherein
$R_1$ and $R_2$ are alkyl groups having from 1 to 6 carbon atoms, and
$m$ and $n$ are independently integers of from 1 to 10.

Illustrative examples of the alkyl groups are methyl, ethyl, propyl, isopropyl, n-butyl, t-butyl, n-amyl, t-amyl, n-hexyl, and the like. Especially preferred are the branched alkyl groups such as t-butyl, t-amyl and t-hexyl groups.

The preparation of the thiodialkanoamidophenol compounds of the present invention are described in our co-pending application Ser. No. 810,352, filed Mar. 35, 1969.

The butadiene rubbers which are particularly stabilized with the above noted aminophenol compounds are polybutadiene, polyisoprene and thermoplastic SBR rubber (styrene-butadiene rubber). The above stabilizer is employed in the amount of from 0.01 to 5% by weight of the butadiene rubber. More preferably, the concentration of the stabilizer is from 0.05 to 2% by weight of the rubber. It is envisioned that prior and/or during manufacturing additional stabilizers and other additives may be added.

The following examples are presented below for the purpose of illustration of the present invention and not to be considered as limiting the invention.

Sample Preparation — Gel Content and test Method

An antioxidant at the indicated concentration level is incorporated into rubber in a Brabender Plasticorder at 110° C for 4 minutes under a nitrogen atmosphere. Twenty-five mil thick compression molded plaques, 2 × × 1 × 0.025 weighing about 1 gm., are oven aged at 100° C in a forced draft oven. Toluene insoluble gel measurements are taken periodically. The % gel content in the same is caluated using the following expression:

$$\% \text{ Gel} = \left( \frac{100 \ W_i - 10 \ W_f}{W_i} \right)$$

where $W_i$ is the weight of dissolved rubber sample in 100 ml. toluene at room temperature and $W_f$ is the weight of residue in 10 ml. filtered solution after evaporation of solvent at 80° C.

In polybutadiene an SBR rubber with the increase in decomposition there is an increase in cross-linking as a result of which the rubber becomes hard and more brittle. In those rubbers the onset of gel formation which accompanies cross-linking is considered as the beginning of decomposition.

In polyisoprene, on the other hand, chain scission rather than cross-linking takes places with decomposition. Thus, the sample becomes sticky and soft with the onset of decomposition. For this reason in the case of polyisoprene, stickiness and not gel formation is used as the criterion for determining the failure of the sample.

Following the above described procedure, polybutadiene, emulsion SBR (Synpol 1500 from Texas U.S. Chemical Company), styene-butadiene copolymer (Kraton 1101 from Shell Chemical Company) and polyisoprene were stabilized with the indicated amount of the antioxidant as shown in the Table below. The stabilization results are also reported in the Table.

TABLE

| Ex. No. | Rubber | Concentration of Antioxidant | Hours to Onset of Gel |
| --- | --- | --- | --- |
| 1 | Polybutadiene | 0.125% N,N'-bis(3',5'-di-t-butyl-4'-hydroxyphenyl)-3-thiapentane-1,5-dicarboxamide (Compound A) | 74 |
| 2 | SBR | 0.125% Compound A | 84 |
| 3 | Polybutadiene | 0.125% N,N'-bis(3',5'-di-t-butyl-4'-hydroxyphenyl9-2-thiapropane-1,3-dicarboxamide (Compound B) | 120 |
| 4 | SBR | 0.125% Compound B | 28 |
| 5 | Styrene-butadiene | 0.01% Compound B | 30 |

TABLE-continued

| Ex. No. | Rubber | Concentration of Antioxidant | | Hours to Onset of Gel |
|---|---|---|---|---|
| 6 | Styrene-butadiene | 0.02% | Compound B | 50 |
| 7 | Styrene-butadiene | 0.05% | Compound B | 140 |
| 8 | Styrene-butadiene | 0.20% | Compound B | 688 |
| 9 | Polyisoprene 0.4% | 0.125% | Compound B | 20 days to onset of stickiness |
| | Polybutadiene | None | | 2 |
| | SBR | None | | 8 |
| | Styrene-butadiene (Kraton) | None | | 2 |
| | Polyisoprene | None | | 2 days (stickiness) |

Equally good stabilization of the above three butadiene rubbers is obtained with N,N'-bis(3'-butyl-5'-methyly-4'-hydroxyphenyl)-2-thiadodecane-1,12-dicarboxamide.

What is claimed is:

1. A butadiene rubber composition subject to oxidative and/or thermal containing from 0.01 to 5% by weight of the rubber of a thiodialkanoamidophenol having the structure

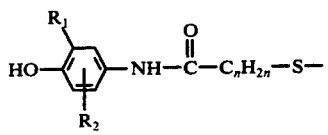

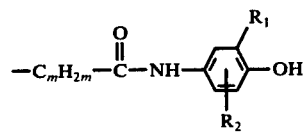

wherein
$R_1$ and $R_2$ are alkyl groups having from 1 to 6 carbon atoms, and
$m$ and $n$ are independently integers of from 1 to 10.

2. A composition of Claim 1, $R_1$ and $R_2$ are t-butyl groups and $n$ and $m$ are 1 or 2.

3. A composition of claim 2, wherein the butadiene rubber is selected from polybutadiene, polyisoprene and styrene-butadiene copolymer.

4. A composition of claim 1, wherein polybutadiene is stabilized with N,N'-bis(3',5'-di-t-butyl-4'-hydroxyphenyl(-3-thiapentane-1,5-dicarboxamide.

5. A composition of claim 1, wherein styrenebutadiene copolymer is stabilized with N,N'-bis(3',5'-di-t-butyl-4'-hydroxyphenyl)-3-thiapentane-1,5-dicarboxamide.

6. A composition of claim 1, wherein polybutadiene is stabilized with N,N'-bis(3', 5'-di-t-butyl-a4'-hydroxyphenyl)-2-thiapropane-1,3-dicarboxamide.

7. A composition of claim 1, where polyisoprene is stabilized with N,N'-bis(3',5'-di-t-butyl-4'-hydroxyphenyl)-2-thiapropane-1,3-dicarboxamide.

* * * * *